(12) United States Patent
Grzes et al.

(10) Patent No.: US 12,537,026 B2
(45) Date of Patent: Jan. 27, 2026

(54) METHOD OF PARTITIONING VIDEO DATA BETWEEN MULTIPLE DISCS

(71) Applicant: MOTOROLA SOLUTIONS, INC., Chicago, IL (US)

(72) Inventors: Marcel Grzes, Pozna (PL); Lukasz Sroka, Kamie (PL); Rafal Borak, Zywiec (PL); Tomasz Kwasniak, Gilwice (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 18/642,963

(22) Filed: Apr. 23, 2024

(65) Prior Publication Data
US 2025/0329346 A1    Oct. 23, 2025

(51) Int. Cl.
*G11B 20/10* (2006.01)
*G11B 27/034* (2006.01)
*G11B 27/10* (2006.01)

(52) U.S. Cl.
CPC ...... *G11B 20/10527* (2013.01); *G11B 27/034* (2013.01); *G11B 27/105* (2013.01); *G11B 2220/2562* (2013.01)

(58) Field of Classification Search
None
See application file for complete search history.

(56) References Cited

U.S. PATENT DOCUMENTS

| | | | | |
|---|---|---|---|---|
| 6,397,036 B1* | 5/2002 | Thean | ...................... | G09B 5/14 434/350 |
| 8,355,617 B2* | 1/2013 | Tsujii | ..................... | G11B 27/34 386/239 |
| 8,364,929 B2 | 1/2013 | Haines et al. | | |
| 8,787,733 B2* | 7/2014 | Subramanian | ......... | H04N 5/782 386/291 |
| 8,989,562 B2* | 3/2015 | Kummer | ............ | H04N 21/4147 386/297 |
| 9,043,374 B2* | 5/2015 | Staffer | ................ | G06F 16/1727 707/830 |
| 9,426,407 B2* | 8/2016 | Garrison | .................. | H04N 5/76 |
| 9,786,317 B2* | 10/2017 | Yoneda | ................ | G11B 27/105 |
| 9,830,111 B1* | 11/2017 | Patiejunas | ............. | G06F 3/0625 |
| 10,127,942 B2* | 11/2018 | Yoneda | ................... | G11B 19/26 |
| 2002/0054750 A1* | 5/2002 | Ficco | ................. | H04N 21/4314 386/214 |
| 2003/0103055 A1* | 6/2003 | DaSilva | ............. | H04N 21/2312 348/E5.007 |
| 2004/0120226 A1* | 6/2004 | Ryu | ...................... | G11B 27/105 369/53.22 |
| 2005/0226605 A1* | 10/2005 | Wang | .................... | G11B 27/034 386/E5.064 |
| 2007/0214405 A1* | 9/2007 | Chang | .................. | G11B 27/105 715/203 |
| 2009/0226153 A1* | 9/2009 | Libin | ................. | G11B 20/1217 386/328 |

(Continued)

*Primary Examiner* — Daniel T Tekle

(57) ABSTRACT

The computer-implemented method and the computing device for partitioning video data between multiple discs are disclosed. An evidence data and/or a list of evidence data comprising multiple items, wherein at least some items are grouped in events, is received. An event for allocation is selected and allocated by assigning each item of the event to a disc according to a predefined criteria.

19 Claims, 5 Drawing Sheets

(56) References Cited

U.S. PATENT DOCUMENTS

| | | | |
|---|---|---|---|
| 2009/0228669 A1* | 9/2009 | Slesarev | G06F 3/0649 |
| | | | 711/161 |
| 2009/0304364 A1* | 12/2009 | Park | G11B 27/002 |
| | | | 386/241 |
| 2012/0078985 A1* | 3/2012 | Staffer | G06F 16/1727 |
| | | | 707/830 |
| 2017/0277574 A1* | 9/2017 | Anami | G06F 9/505 |

* cited by examiner

METHOD OF PARTITIONING VIDEO DATA BETWEEN MULTIPLE DISCS

BACKGROUND OF THE INVENTION

Recordings produced by modern cameras can be large and consist of multiple video and audio streams. Storing the data on a physical disc such as DVD or Blu-ray still plays an important role in some areas, like evidence management or judiciary. Known methods of spanning (cutting large video streams and distributing the parts between discs) and partitioning (distributing streams of a recording onto discs) usually focus on minimizing the number of used disks. This leads to unintuitive and unordered distribution of streams between discs and makes using burned discs as evidence in court uncomfortable.

Therefore, there is a need for an improved method of partitioning video data between multiple discs.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
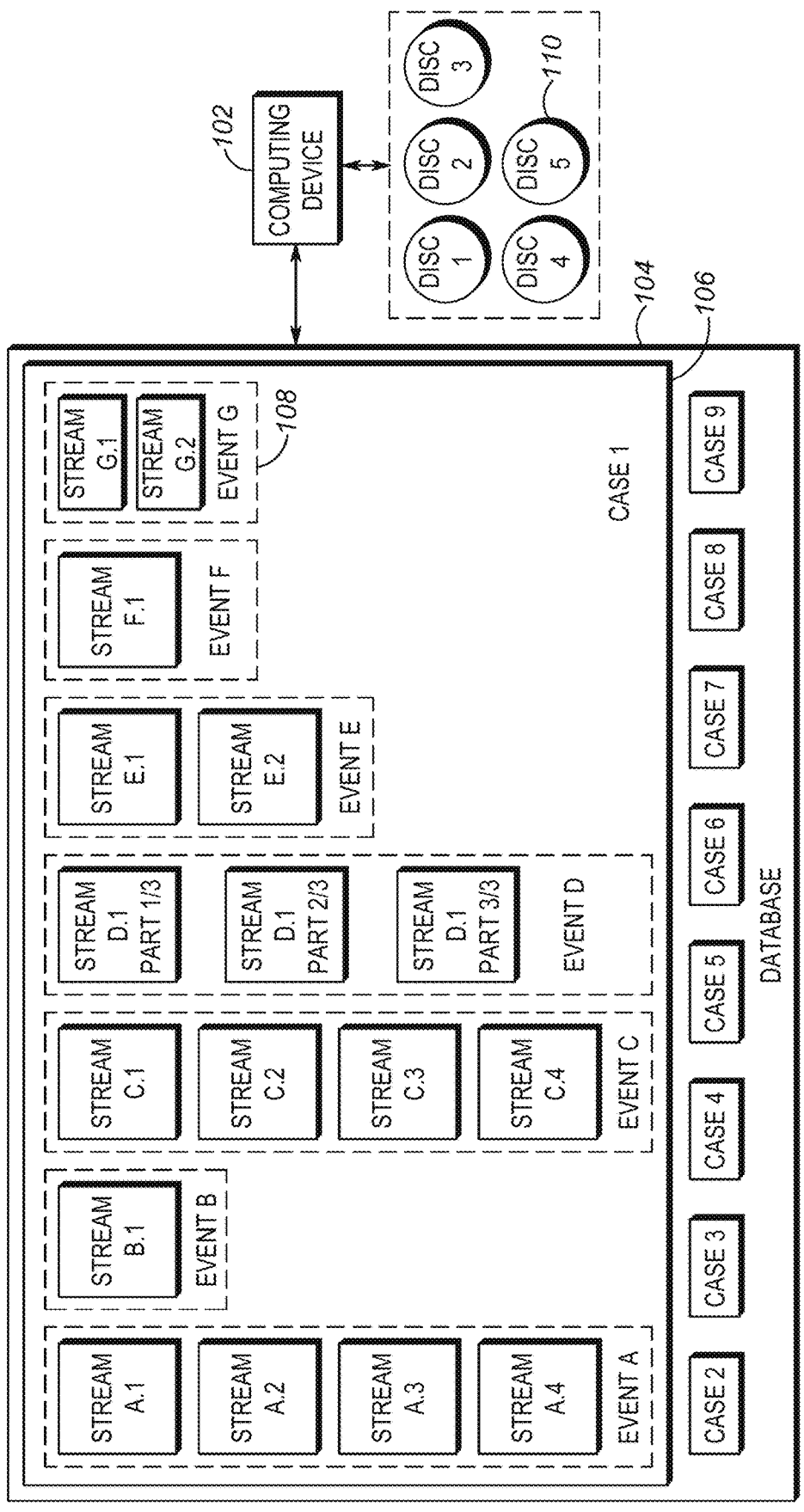
FIG. 1 is a system diagram illustrating a system configuration, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

To address the above-mentioned problem, process of and computing devices for partitioning video data between multiple discs are provided herein.

A first aspect of the present invention provides a method of partitioning video data between multiple discs comprising: receiving an evidence data and/or a list of evidence data comprising multiple items, wherein at least some items are grouped in events; selecting an event for allocation, the event comprising at least one item being a video stream or a part of the video stream, wherein each item being a part of the event has an event ID, and wherein the items of the selected event have a selected event ID; allocating the selected event by assigning each item with the selected event ID to a disc, wherein assigning an item with the selected event ID to the disc comprises: selecting one or more discs by determining if any item with the selected event ID is already assigned to any of the discs and: in response to determining that at least one item with the selected event ID is already assigned to any of the discs, excluding discs that do not have enough remaining capacity to store the item with the selected event ID; and selecting all remaining discs having any item with the selected event ID already assigned; otherwise, excluding discs with any part of any video stream assigned except the discs with the last part of any video stream, excluding discs that do not have enough remaining capacity to store all unassigned items with the selected event ID; and selecting all remaining discs; assigning the item to the selected disc or one of the selected discs if there is at least one selected disc; adding a new disc and assigning the item to the new disc if there is no selected disc; and repeating the steps of selecting the event for allocation and allocating the selected event until all items are assigned to one of the discs.

A second aspect of the present invention provides a device for partitioning video data between multiple discs comprising a controller; and a memory coupled to the controller, the memory containing a set of instructions thereon that when executed by the controller cause the controller to: receive an evidence data and/or a list of evidence data comprising multiple items, wherein at least some items are grouped in events; select an event for allocation, the event comprising at least one item being a video stream or a part of the video stream, wherein each item being a part of the event has an event ID, and wherein the items of the selected event have a selected event ID; allocate the selected event by assigning each item with the selected event ID to a disc, wherein assigning an item with the selected event ID to the disc comprises: selecting one or more discs by determining if any item with the selected event ID is already assigned to any of the discs and: in response to determining that at least one item with the selected event ID is already assigned to any of the discs, excluding discs that do not have enough remaining capacity to store the item with the selected event ID; and selecting all remaining discs having any item with the selected event ID already assigned; otherwise, excluding discs with any part of any video stream assigned except the discs with the last part of any video stream, excluding discs that do not have enough remaining capacity to store all unassigned items with the selected event ID; and selecting all remaining discs; assigning the item to the selected disc or one of the selected discs if there is at least one selected disc; adding a new disc and assigning the item to the new disc if there is no selected disc; and repeat the steps of selecting the event for allocation and allocating the selected event until all items are assigned to one of the discs.

A third aspect of the present invention provides a non-transitory, computer-readable storage medium having program instructions stored thereon that when executed by one or more processors cause the one or more processors to: in response to receive an evidence data and/or a list of evidence data comprising multiple items, wherein at least some items are grouped in events, select an event for allocation, the event comprising at least one item being a video stream or a part of the video stream, wherein each item being a part of the event has an event ID, and wherein the items of the selected event have a selected event ID; allocate the selected event by assigning each item with the selected event ID to a disc, wherein assigning an item with the selected event ID to the disc comprises: selecting one or more discs by determining if any item with the selected event ID is already assigned to any of discs and: in response to determining that at least one item with the selected event ID is already assigned to any of the discs, excluding discs that do not have enough remaining capacity to store the item with the selected event ID; and selecting all remaining discs having any item with the selected event ID already assigned; otherwise, excluding discs with any part of any video stream assigned except the discs with the last part of any video stream, excluding discs that do not have enough remaining capacity to store all unassigned items with the selected event ID; and selecting all remaining discs; assigning the item to the selected disc or one of the selected discs if there is at least one selected disc; adding a new disc and assigning the item to the new disc if there is no selected disc; and repeat the steps of selecting the event for allocation and allocating the selected event until all items are assigned to one of the discs.

Turning now to the drawings, wherein numerals designate like components, FIG. 1 illustrates an exemplary operational environment for the present invention, a system 100.

FIG. 1 shows one example of a system configuration, in which embodiments may be implemented. Other configurations are possible. In the example shown, the system 100 includes a computing device 102 and a database 104. It should be understood that the system 100 is provided as one example and, in some embodiments, the system 100 may include fewer or additional components. As would be understood by one skilled in the art, FIG. 1 is a simplified diagram. System may be more or less complex than the schematic elements depicted in FIG. 1.

The computing device 102 is configured to perform the method of partitioning video data between multiple discs and will be discussed in more detail below, with respect to FIG. 2.

The computing device 102 is communicatively coupled to the database 104. As illustrated in FIG. 1, the database 104 may be a database housed on a suitable database server communicatively coupled to and accessible by the computing device 102.

In alternative embodiments, the computing device 102 and/or the database 104 may be part of a cloud-based database computer system. In some embodiments, all or part of the database 104 may be locally stored on the (perhaps on premise) computing device 102.

For example, the computing device 102 may be a dispatch computer being a part of public safety answering point (PSAP) or another computer being a part of a public safety agency's computer network.

The database 104 stores an evidence data comprising video and/or audio streams related to incidents, for example public safety incidents. As mentioned above, recordings produced by modern cameras can be large and consist of multiple video and audio streams. For example, in-car video systems can capture video of an incident from multiple points using a front camera, a rear camera, a left side camera, a right side camera, a cabin camera, and a panoramic camera. Moreover, the incident can be captured by body-worn police cameras.

For example, as illustrated in FIG. 1, the database 104 can store nine cases 106 (from Case 1 to Case 9). Case 1 can have seven events 108, from Event A to Event G, wherein events A, C, E, G were recorded by four different in-car video systems and events B, D and F were captured by body-worn cameras. Event G comprises two streams marked in the FIG. 1 as stream G.1 and stream G.2, wherein "G" is the event ID and "1", "2" are stream numbers. Event D comprises one large video stream D.1. Although depicted as cut into three parts, the video stream D.1 may be stored in the database 104 as a one file and may be cut (spanned) into parts while exporting the Case 1. The parts of the stream inherit the event ID from the cut stream.

The database 104 may also store other types of the evidence data, so-called attachments, i.e. items that are neither video streams nor parts of the video stream. The attachments may be for example pictures, notes, testimonies, scans of documents etc. (jpg, txt, or other formats of files). The attachments do not have the event ID (are not a part of an event), but may be a part of a case.

When video recordings are to be used in a court as evidence, all necessary items (video streams, audio streams, attachments, etc.) have to be identified and exported to multiple discs 110, for example DVDs, Blu-ray discs, USB memory sticks or another types of discs.

During the process of partitioning video data between multiple discs, an allocation of the items into the discs is performed. As a result, a mapping of the items to the discs is created—every item is assigned to a disc, such that the sum of sizes of items assigned to the disc does not exceed a capacity of the disc. If a certain item is larger than the capacity of the disc, parts of the item are assigned to a plurality of discs. Therefore, a first item is assigned to a first disc or to a first plurality of discs. The second item can be assigned to the first disc (or one of the discs being the first plurality of the discs) or a new disc added to the mapping to have a second item assigned. For every next item, it is decided if said item can be assigned to one of the discs already present in the mapping or if an additional disc is required, depending on predefined rules and a remaining capacity of the discs already present in the mapping. Based on the mapping obtained in the process of partitioning video data between multiple discs an ISO image file or an export package can be created. The export package can be downloaded to a local computer to be burned on disc, forwarded to a DVD robot queue, or downloaded to a folder on the local computer.

Figure 2:
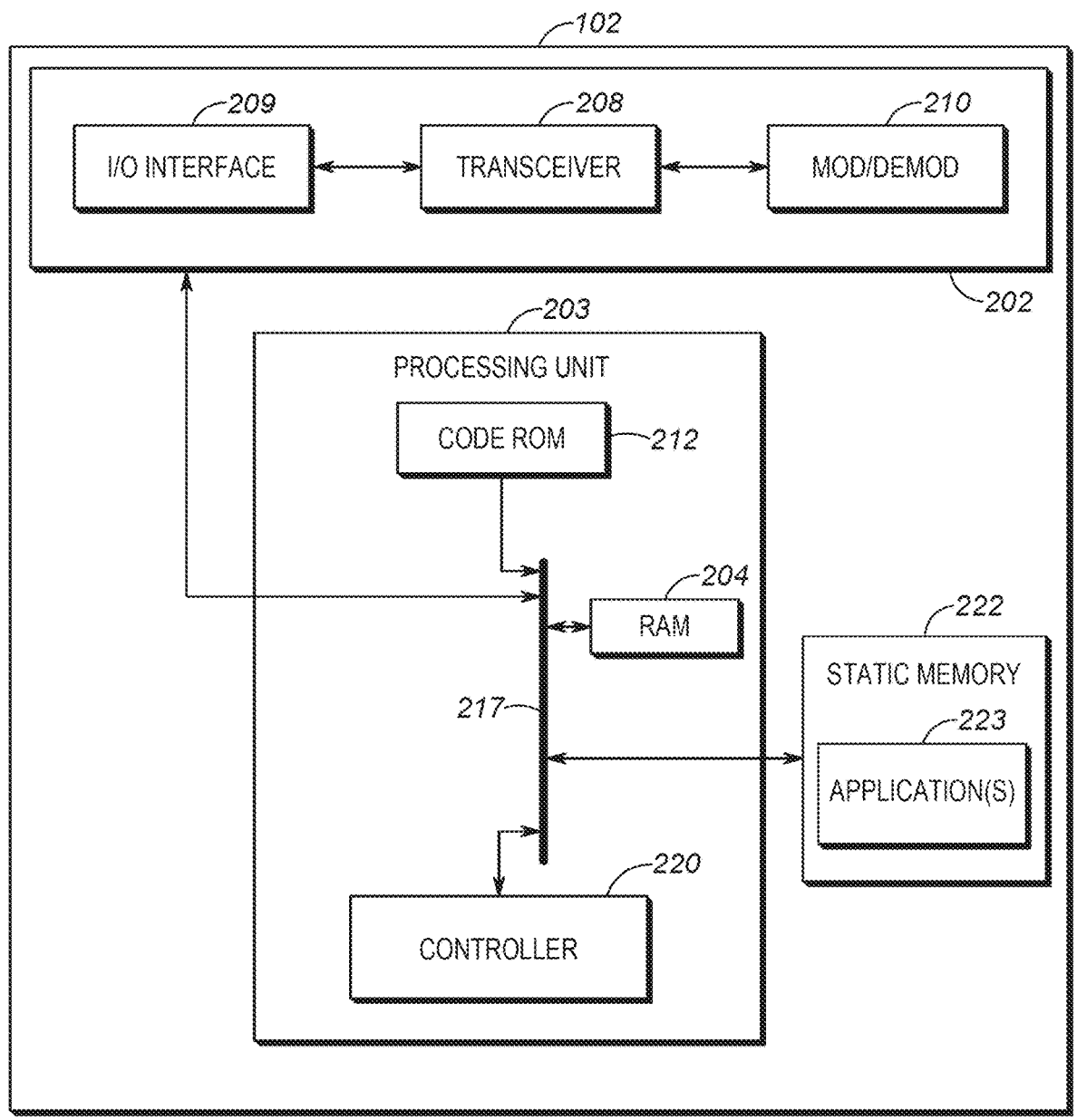
FIG. 2 is a device diagram showing a device structure of a computing device for partitioning video data between multiple discs, in accordance with some embodiments.

FIG. 2 schematically illustrates one embodiment of the computing device 102.

As shown in FIG. 2, the computing device 102 includes the communication unit 202 communicatively coupled to the common data and address bus 217 of the processing unit 203. The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory (RAM) 204 and the static memory 222.

The communication unit 202 may include one or more wired and/or wireless input/output (I/O) interfaces 209, which are configurable to communicate with a communication network. For example, the communication unit 202 may include one or more transceivers 208 and/or wireless transceivers for communicating with the communication network and/or parts of the network. The one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication unit 202 may optionally include one or more wireline transceivers 208, such as an Ethernet transceiver, a USB (Universal Serial Bus) transceiver, or a similar transceiver configurable to communicate via a twisted pair wire, a coaxial cable, a fiber-optic link, or a similar physical connection to a wireline network. The transceiver 208 is also coupled to a combined modulator/demodulator 210.

The controller 220 may include ports (e.g., hardware ports) for coupling to other hardware components.

The controller 220 may include one or more logic circuits, one or more processors, one or more microprocessors, and/or the controller 220 may include one or more ASIC (application-specific integrated circuits) and one or more FPGA (field-programmable gate arrays), and/or another electronic device. In some examples, the controller 220 and/or the computing device 102 is not a generic controller and/or a generic device, but a device specifically configured to implement functionality for executing the cloud services in a cloud environment. For example, in some examples, the computing device 102 and/or the controller 220 specifically comprises a computer-executable engine configured to implement functionality of partitioning video data between multiple discs.

The static memory 222 is a non-transitory machine-readable medium that stores machine-readable instructions to implement one or more programs or applications. Example machine-readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine-readable instructions) that implement some or all of the functional teachings of the computing device 102 as described herein are maintained, persistently, at the memory 222 and used by the controller 220, which makes appropriate utilization of volatile storage during the execution of such programming instructions.

Figure 3:
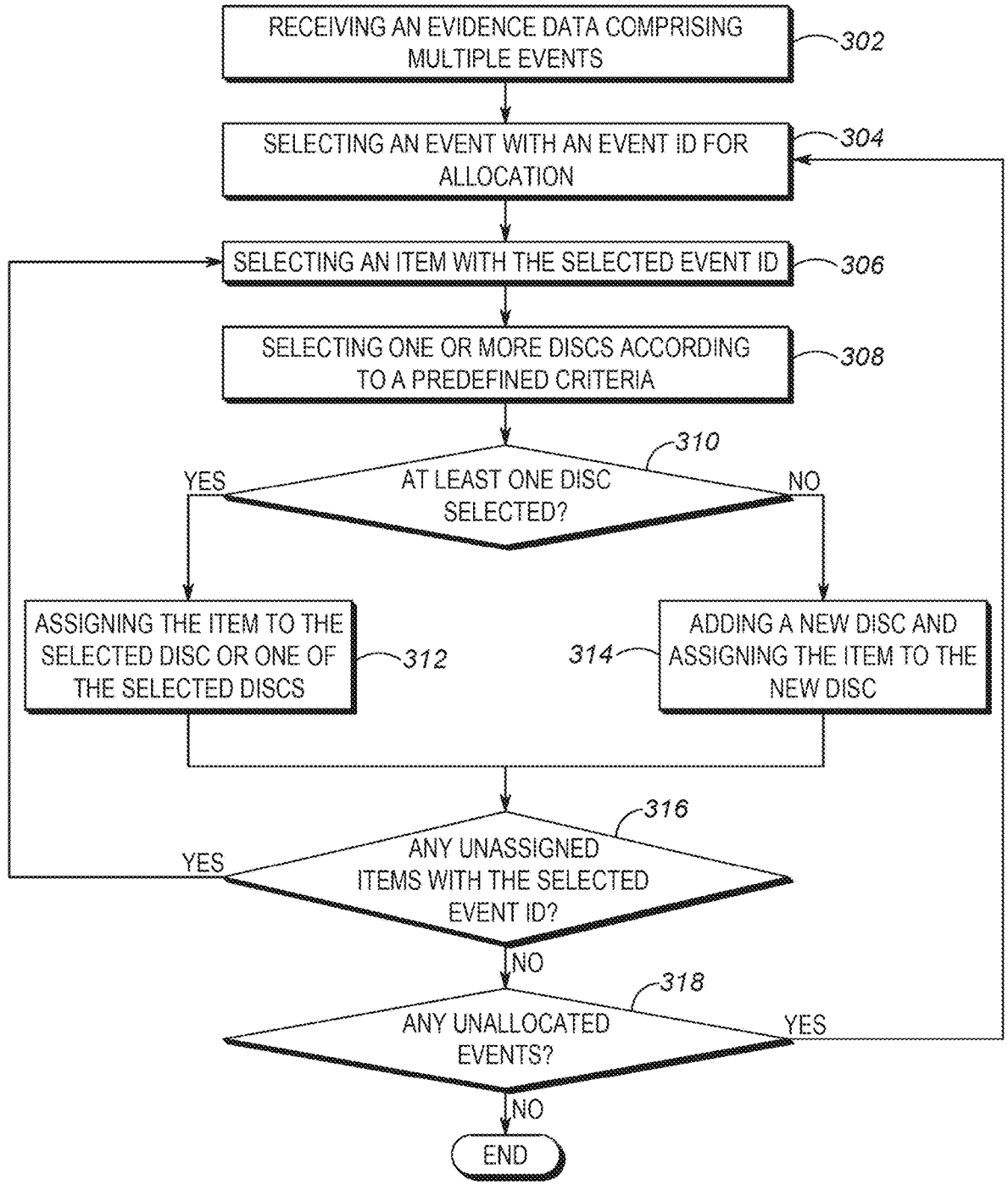
FIG. 3 is a flowchart of a process of partitioning video data between multiple discs, in accordance with some embodiments.

In particular, the memory 222 stores instructions corresponding to the at least one application 223 that, when executed by the controller 220, enable the controller 220 to implement functionality of partitioning video data between multiple discs including, but not limited to, one or more of the blocks of the process outlined in FIG. 3.

In one illustrated example, when the controller 220 executes the application 223, the controller 220 is enabled to: receive an evidence data and/or a list of evidence data comprising multiple items, wherein at least some items are grouped in events; select an event for allocation, the event comprising at least one item being a video stream or a part of the video stream, wherein each item being a part of the event has an event ID, and wherein the items of the selected event have a selected event ID; allocate the selected event by assigning each item with the selected event ID to a disc, wherein assigning an item with the selected event ID to the disc comprises: selecting one or more discs by determining if any item with the selected event ID is already assigned to any of discs and: in response to determining that at least one item with the selected event ID is already assigned to any of discs, excluding discs that do not have enough remaining capacity to store the item with the selected event ID; and selecting all remaining discs having any item with the selected event ID already assigned; otherwise, excluding discs with any part of any video stream assigned except the discs with the last part of any video stream, excluding discs that do not have enough remaining capacity to store all unassigned items with the selected event ID; and selecting all remaining discs; assigning the item to the selected disc or one of the selected discs if there is at least one selected disc; adding a new disc and assigning the item to the new disc if there is no selected disc; and repeat the steps of selecting the event for allocation and allocating the selected event until all items are assigned to one of the discs.

Moreover, an embodiment can be implemented as a non-transitory, computer-readable storage medium having program instructions stored thereon that when executed by the controller 220, enables the controller 220 to implement the functionality of partitioning video data between multiple discs.

Attention is now directed to FIG. 3, which depicts a flowchart representative of a process 300 of partitioning video data between multiple discs. The operations of process 300 of FIG. 3 correspond to machine-readable instructions that are executed by the computing device 102, and specifically the controller 220 of the computing device 102. In the illustrated example, the instructions represented by the blocks of FIG. 3 are stored in the memory 222 for example, as the application 223. Process 300 of FIG. 3 is one way, among others, in which the controller 220 and/or the computing device 102 and/or the system 100 may be configured.

Process 300 of FIG. 3 need not be performed in the exact sequence as shown and likewise, various blocks may be performed in parallel rather than in sequence. Accordingly, the elements of process 300 are referred to herein as "blocks" rather than "steps." Process 300 of FIG. 3 may be implemented on variations of the system 100 of FIG. 1, as well.

At block 302, an evidence data comprising multiple items grouped in events (at least two) is received. In some embodiments, especially if the database 104 is a part of the computing device 102, receiving the evidence data means receiving a list of items that have to be exported into discs. Selection is usually performed by a user, for example a public safety agency personnel. In some embodiments, the whole case 106 is selected. The user may also select some additional items and/or remove some items from the list.

In some embodiments, the process 300 comprises cutting video streams exceeding a predefined size into parts of the video streams. The predefined size corresponds to the size of discs that are used for export. In some embodiments cutting video streams is performed before assigning items to discs, for example as a step performed after receiving the evidence data and/or the list of evidence data for allocation. In other embodiments, cutting video streams may be performed later during the process.

At block 304, an event for allocation is selected. In this block the event with the selected event ID is identified among the events that are not yet allocated. In some embodiments, selecting the event for allocation comprises selecting the event of the largest size. This means that every time the event is selected for allocation, the sum of sizes of items grouped in this event is determined and priority is given to the event with the items of the largest summed size.

At block 306, an item with the selected event ID is selected among unassigned items of this event, i.e. among items of this event that are not yet assigned to any of the discs. In some embodiments, assigning items starts from the item of the largest size among unassigned items with the selected event ID (i.e. within the event that is being currently allocated).

Figure 4:
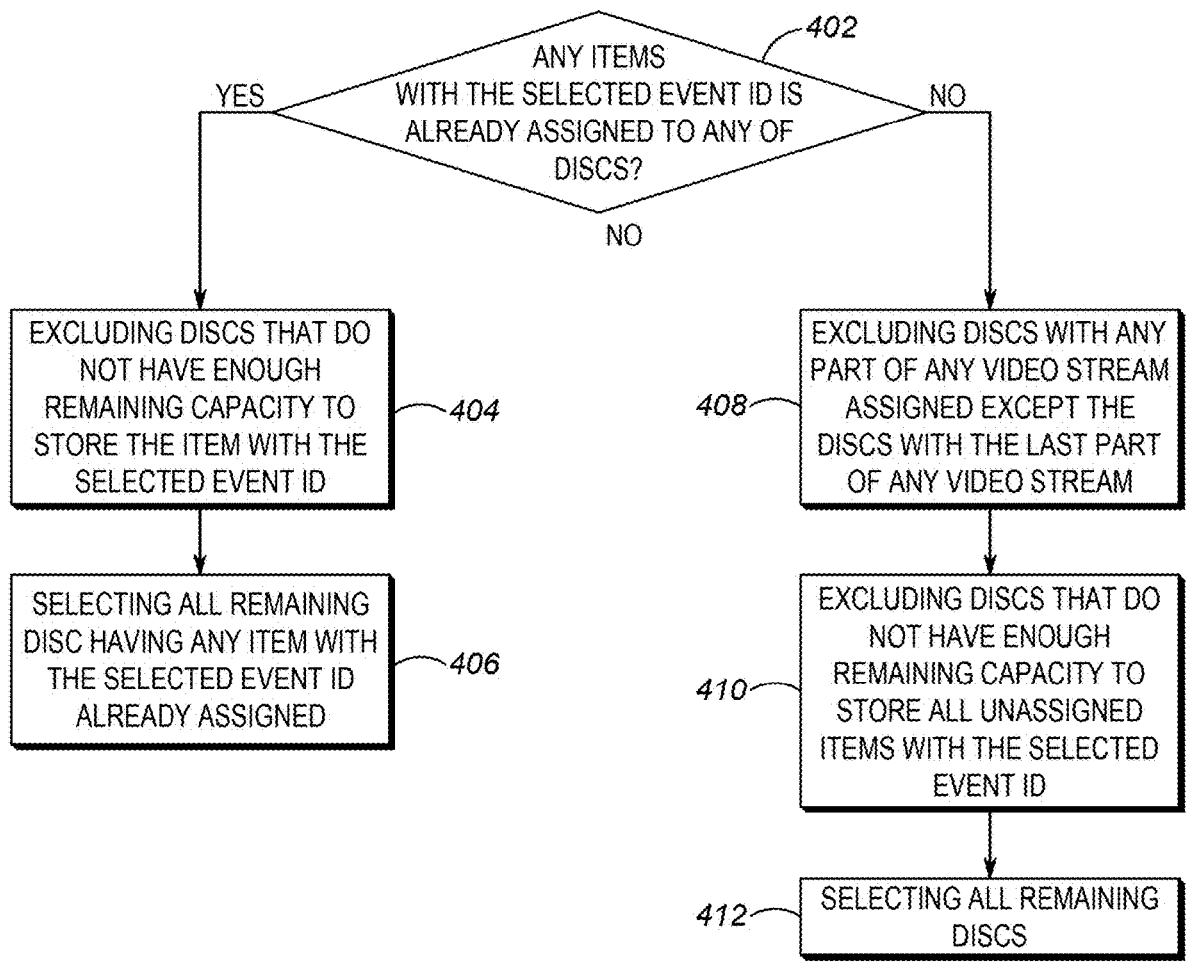
FIG. 4 is a flowchart of a part of the process of partitioning video data between multiple discs, in accordance with some embodiments.

At block 308, selecting one or more discs according to a predefined criteria is performed. A process of selecting one or more discs is illustrated on FIG. 4 for improved readability of drawings.

The process performed at block 308, i.e. the process of selecting one or more discs starts from determining in block 402 if any item with the selected event ID is already assigned to any of the discs.

In response to determining that at least one item with the selected event ID is already assigned to any of discs, the process is continued at blocks 404 and 406.

At block 404, all discs that do not have enough remaining capacity to store the item with the selected event ID (i.e. the item that is being currently assigned to a disc) are excluded from selection.

At block 406, all remaining (i.e. not excluded) discs having any item with the selected event ID already assigned are selected.

Otherwise, i.e. in response to determining that none of the discs has an item with the selected event ID assigned yet, the process is continued at blocks 408, 410, and 412.

At block 408, all discs with any part of any video stream assigned, except the discs with the last part of any video stream, are excluded. It means that only discs with the last part of the video stream may be selected.

At block 410, all discs that do not have enough remaining capacity to store all unassigned items with the selected event ID are excluded. As a result a disc may comprise only whole events and/or the last part of any video stream.

At block 412, all remaining (not excluded) discs are selected.

In some embodiments, all discs with any part of any video stream assigned, except the discs with the last part of any video stream, are excluded from having further streams assigned, i.e. even a stream with the same event ID cannot be assigned to a disc with spanned (cut) video stream if it is not a disc with the last part of the stream.

As a result of process 308 (blocks 402-412), one or more discs or none of the discs is selected.

The process 300 is then continued at block 310, in which it is determined if at least one disc was selected at block 308.

If there is at least one selected disc, the item with the selected event ID is assigned, at block 312, to the selected disc or to one of the selected discs.

If there is no selected disc, a new disc is added, at block 314, and the item with the selected event ID is assigned to the new disc.

The process of assigning items with the selected event ID is continued until it is determined at block 316 that there are any unassigned items with the selected event ID left.

Then, the steps of selecting the event for allocation and allocating the selected event are repeated until it is determined at block 318 that all items are assigned to one of the discs.

In some embodiments, the process may be further continued, as the evidence data and/or a list of evidence data may comprise at least one attachment, wherein the attachment does not have an event ID.

A process of assigning the attachment to a disc may comprise: excluding discs that do not have enough remaining capacity to store the attachment, selecting all remaining discs and: assigning the attachment to the selected disc or one of the selected discs if there is at least one selected disc, or adding a new disc and assigning the attachment to the new disc if there is no selected disc.

The process 300 may further comprise the block (not shown) comprising creating an ISO image file based on the obtained allocation of items into discs.

Additionally or alternatively, the process 300 may further comprise the block (not shown) comprising forwarding an export package obtained based on the allocation of items into discs to a DVD robot queue.

Figure 5:
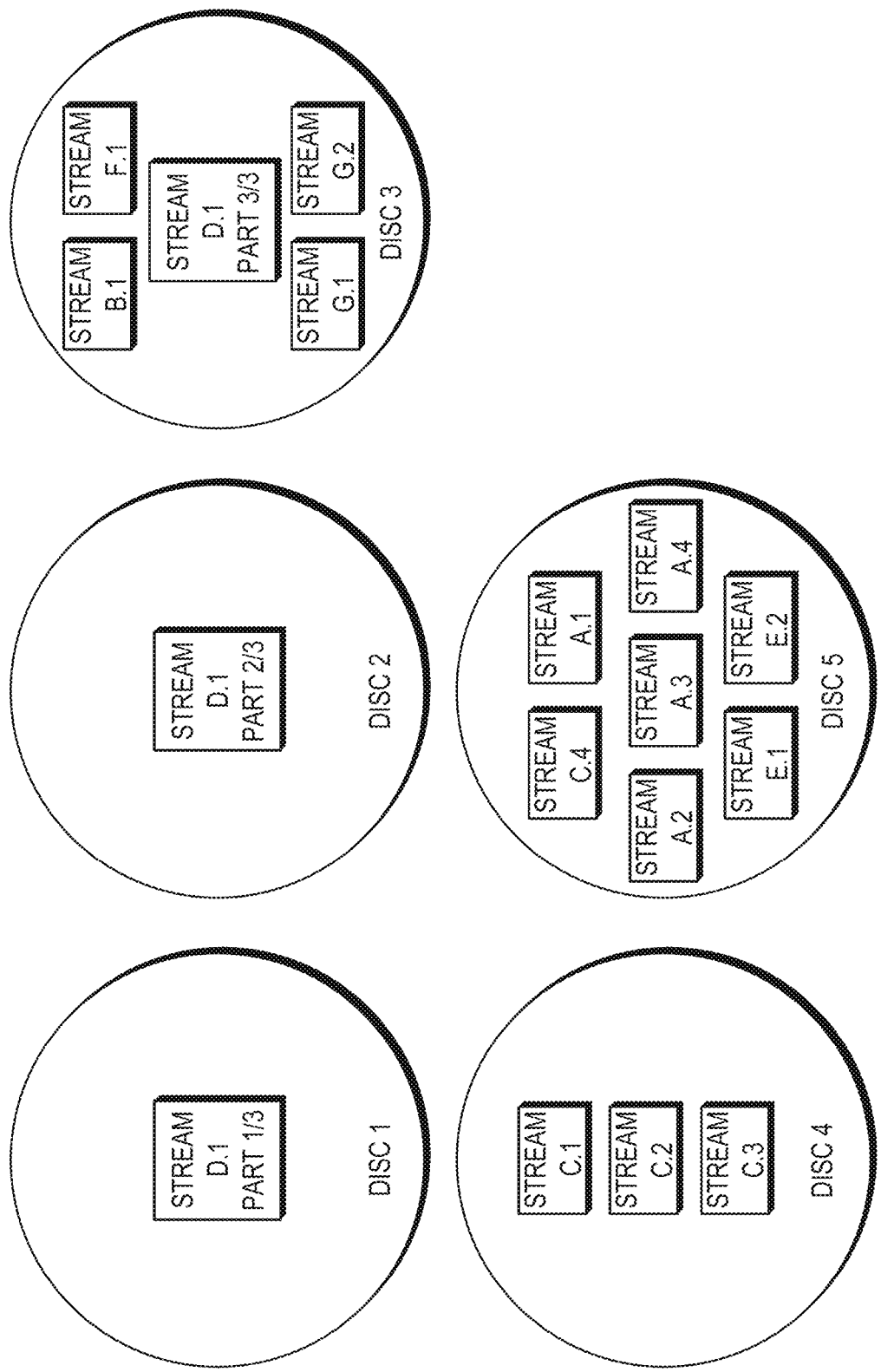
FIG. 5 is a mapping of video data into the multiple discs obtained by the process according to some embodiments.

Result of the process 300 is shown on FIG. 5. The obtained allocation of streams into discs is clear and intuitive. Events are always in the right order-even if the event cannot fit on a single disc, the next streams are always on the next consecutive disc(s) (see Event C). If possible, whole events (with multiple streams) are placed on a single disc, rather than being partitioned into multiple discs (see Event A, Event E, Event G). No other stream or event can be allocated to a disc where a part of a spanned event has already been placed, unless this spanned part is the last one (see Event D). Therefore the invention makes it easier for agencies/officers to use physical evidence in the form of disc recordings.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture.

It is contemplated that any part of any aspect or embodiment discussed in this specification can be implemented or combined with any part of any other aspect or embodiment discussed in this specification.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

It should also be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Thus, in the claims, if an apparatus or system is claimed, for example, as including an electronic processor or other element configured in a certain manner, for example, to make multiple determinations, the claim or claim element should be interpreted as meaning one or more electronic processors (or other element) where any one of the one or more electronic processors (or other element) is configured as claimed, for example, to make some or all of the multiple determinations. To reiterate, those electronic processors and processing may be distributed.

What is claimed is:

1. A method of partitioning video data between multiple discs comprising:
   receiving an evidence data and/or a list of evidence data comprising multiple items, wherein at least some items are grouped in events;
   selecting an event for allocation, the event comprising at least one item being a video stream or a part of the video stream, wherein each item being a part of the event has an event ID, and wherein the items of the selected event have a selected event ID;
   allocating the selected event by assigning each item with the selected event ID to a disc, wherein assigning an item with the selected event ID to the disc comprises:
      selecting one or more discs by determining if any item with the selected event ID is already assigned to any of the discs and:
         in response to determining that at least one item with the selected event ID is already assigned to any of the discs, excluding discs that do not have enough remaining capacity to store the item with the selected event ID;
         and selecting all remaining discs having any item with the selected event ID already assigned;
         otherwise, excluding discs with any part of any video stream assigned except the discs with the last part of any video stream, excluding discs that do not have enough remaining capacity to store all unassigned items with the selected event ID; and selecting all remaining discs;
      assigning the item to the selected disc or one of the selected discs if there is at least one selected disc;
      adding a new disc and assigning the item to the new disc if there is no selected disc; and
   repeating the steps of selecting the event for allocation and allocating the selected event until all items are assigned to one of the discs.

2. The method of claim 1, comprising cutting video streams exceeding a predefined size into parts of the video streams.

3. The method of claim 1, wherein selecting the event for allocation comprises selecting the event of the largest size.

4. The method of claim 1, wherein allocating the selected event by assigning each item with the selected event ID to a disc comprises assigning items starting from the item of the largest size among unassigned items with the selected event ID.

5. The method of claim 1, wherein the discs with any part of the video stream assigned, except the discs with the last part of the video stream, are excluded from being the selected disc.

6. The method of claim 1, wherein the evidence data and/or a list of evidence data comprises at least one attachment, wherein the attachment does not have an event ID.

7. The method of claim 6, wherein assigning the attachment to the disc comprises:
   excluding discs that do not have enough remaining capacity to store the attachment; selecting all remaining discs;
   assigning the attachment to the selected disc or one of the selected discs if there is at least one selected disc; and
   adding a new disc and assigning the attachment to the new disc if there is no selected disc.

8. The method of claim 1, further comprising creating an ISO image file based on an obtained allocation of items into discs.

9. The method of claim 1, further comprising forwarding an export package obtained based on the allocation of items into discs to a DVD robot queue.

10. A device for partitioning video data between multiple discs comprising:
    a controller; and
    a memory coupled to the controller, the memory containing a set of instructions thereon that when executed by the controller cause the controller to:
       receive an evidence data and/or a list of evidence data comprising multiple items, wherein at least some items are grouped in events;
       select an event for allocation, the event comprising at least one item being a video stream or a part of the video stream, wherein each item being a part of the event has an event ID, and wherein the items of the selected event have a selected event ID;
       allocate the selected event by assigning each item with the selected event ID to a disc, wherein assigning an item with the selected event ID to the disc comprises:
          selecting one or more discs by determining if any item with the selected event ID is already assigned to any of discs and:
             in response to determining that at least one item with the selected event ID is already assigned to any of discs, excluding discs that do not have enough remaining capacity to store the item with the selected event ID;
             and selecting all remaining discs having any item with the selected event ID already assigned;
             otherwise, excluding discs with any part of any video stream assigned except the discs with the last part of any video stream, excluding discs that do not have enough remaining capacity to store all unassigned items with the selected event ID; and selecting all remaining discs;
          assigning the item to the selected disc or one of the selected discs if there is at least one selected disc;
          adding a new disc and assigning the item to the new disc if there is no selected disc; and
       repeat the steps of selecting the event for allocation and allocating the selected event until all items are assigned to one of the discs.

11. The device of claim 10, wherein the controller is further configured to cause cutting video streams exceeding a predefined size into parts of the video streams.

12. The method of claim 1, wherein the controller is further configured to select the event for allocation by selecting the event of the largest size.

13. The device of claim 10, wherein the controller is further configured to allocate the selected event by assigning each item with the selected event ID to a disc, wherein items are assigned starting from the item of the largest size among unassigned items with the selected event ID.

14. The device of claim 10, wherein the discs with any part of the video stream assigned, except the discs with the last part of the video stream, are excluded from being the selected disc.

15. The device of claim 10, wherein the evidence data and/or a list of evidence data comprises at least one attachment, wherein the attachment does not have an event ID.

16. The device of claim 15, wherein the controller is further configured to assign the attachment to the disc by:
    excluding discs that do not have enough remaining capacity to store the attachment; selecting all remaining discs;
    assigning the attachment to the selected disc or one of the selected discs if there is at least one selected disc; and adding a new disc and assigning the attachment to the new disc if there is no selected disc.

17. The device of claim 10, wherein the controller is further configured to create an ISO image file based on an obtained allocation of items into discs.

18. The device of claim 10, wherein the controller is further configured to forward an export package obtained based on the allocation of items into discs to a DVD robot queue.

19. A non-transitory, computer-readable storage medium having program instructions stored thereon that when executed by one or more processors cause the one or more processors to:
- in response to receive an evidence data and/or a list of evidence data comprising multiple items, wherein at least some items are grouped in events, select an event for allocation, the event comprising at least one item being a video stream or a part of the video stream, wherein each item being a part of the event has an event ID, and wherein the items of the selected event have a selected event ID;
- allocate the selected event by assigning each item with the selected event ID to a disc, wherein assigning an item with the selected event ID to the disc comprises:
  - selecting one or more discs by determining if any item with the selected event ID is already assigned to any of discs and:
    - in response to determining that at least one item with the selected event ID is already assigned to any of discs, excluding discs that do not have enough remaining capacity to store the item with the selected event ID;
    - and selecting all remaining discs having any item with the selected event ID already assigned;
    - otherwise, excluding discs with any part of any video stream assigned except the discs with the last part of any video stream, excluding discs that do not have enough remaining capacity to store all unassigned items with the selected event ID; and selecting all remaining discs;
  - assigning the item to the selected disc or one of the selected discs if there is at least one selected disc;
  - adding a new disc and assigning the item to the new disc if there is no selected disc; and
- repeat the steps of selecting the event for allocation and allocating the selected event until all items are assigned to one of the discs.

* * * * *